May 16, 1944.  R. C. THOMPSON  2,348,939
SHAFT SEAL
Filed Sept. 28, 1942
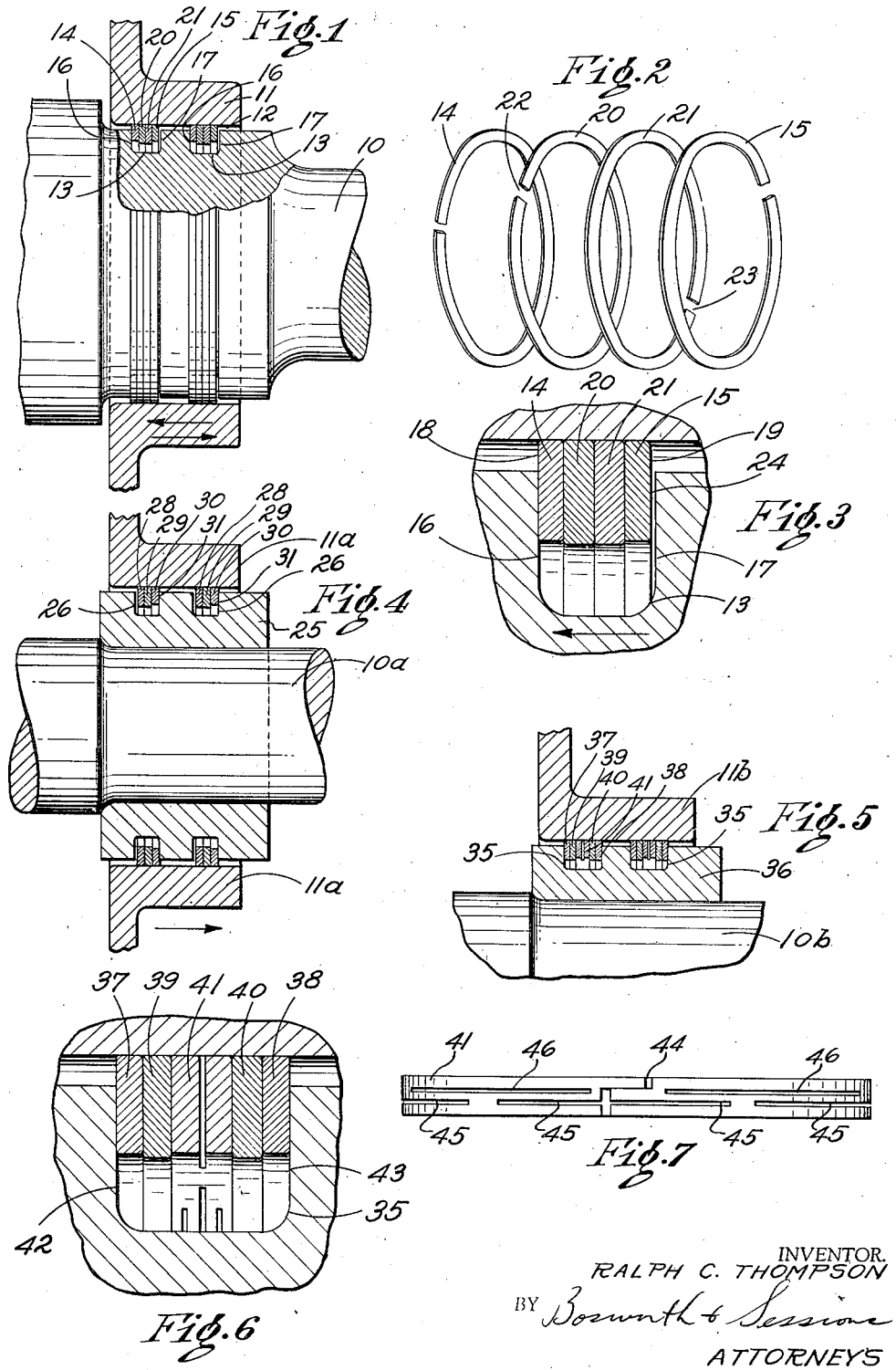
INVENTOR.
RALPH C. THOMPSON
BY Bosworth & Sessions
ATTORNEYS

UNITED STATES PATENT OFFICE 2,348,939

SHAFT SEAL

Ralph C. Thompson, Cleveland Heights, Ohio, assignor to Simplex Products Corporation, Cleveland, Ohio, a corporation of Ohio Application September 28, 1942, Serial No. 459,908

5 Claims. (Cl. 286—7)

This invention relates to shaft seals and more particularly to a seal for preventing fluid from traveling along a rotating shaft where the shaft passes through an opening in a housing.

Aircraft engine and cabin superchargers ordinarily operate at very high rotational speeds. Some such devices operate at speeds as high as 60,000 revolutions per minute, while speeds of 24,000 to 30,000 revolutions per minute are common. Heretofore the problem of sealing the shafts of such devices against leakage of fluid has been a very difficult one for the seals previously employed have been, generally speaking, short lived, and have not been as effective in their sealing action as desired.

Accordingly it is an object of the present invention to provide a simple, effective and long-lived seal for rotating shafts which is particularly adapted for high speed shafts. Another object is to provide such a seal which can be economically manufactured and readily assembled. A further object is to provide a seal of this character which will operate effectively even though there be slight endwise vibration or play in the shaft. Further objects and advantages of my invention will become apparent from the description of preferred forms thereof, reference being made to the accompanying drawing. The essential characteristics are summarized in the claims.

Briefly, I accomplish the above and other objects of my invention by providing a plurality of sealing rings which are preferably of thin resilient metal, one of the rings floating between the shaft and the housing and being arranged to engage a radial shoulder formed on the shaft, for example, and another of the rings being arranged to resiliently engage the housing, for example. This last ring may engage the housing with sufficient force substantially to prevent leakage between the ring and the housing, and does not ordinarily rotate with respect to the housing. The arrangement is such that the fluid pressure along the shaft will slide this ring along the housing into engagement with the floating ring which in turn makes a sealing engagement with the shoulder. Thus one ring seals against the housing and the other ring seals against the shaft, while the two rings themselves are in sealing engagement with each other. This arrangement effectively prevents leakage along the shaft and inasmuch as the floating ring may rotate with respect to both the housing and the shaft, its speed of rotation is cut down on the average to about half the speed of the shaft. This results in a reduction in the wear of the parts, and the use of the two types of rings makes possible the selection of the most desirable materials for both rings. For example, the ring which springs outwardly into engagement with the housing may be made of steel having sufficient resilience to properly engage the housing while the floating ring may be made of material such as bronze selected on account of its friction characteristics. The shoulder is preferably formed by a groove in the shaft, although an internal groove in the housing may be employed, using a ring which springs into engagement with the shaft in conjunction with a floating ring. More than two rings may be employed, depending on the service for which the seal is intended, as will be described below.

Referring to the drawing, in Figure 1 I have shown a section through a shaft and a housing, illustrating two of my seals in position on the shaft; Figure 2 illustrates the several rings which make up the seals of Figure 1; Figure 3 is an enlarged detail of one of the seals shown in Figure 1; Figure 4 is a cross section illustrating seals of a modified form; Figure 5 is a fragmentary cross section illustrating a still further modification of my seal; Figure 6 is an enlarged cross-sectional detail of one of the seals shown in Figure 5; and Figure 7 is an elevation of one of the rings employed in the seals shown in Figures 5 and 6.

In Figure 1 of the drawing I have shown a preferred form of seal as applied to a shaft 10 passing through an opening in a housing 11, there being a clearance as indicated at 12 between the interior of the opening of the housing and the exterior of the shaft. In order to prevent leakage of fluid, for example leakage of oil, air, or a mixture of gasoline vapor and air, along the shaft through the clearance space 12 in either direction, the shaft is provided with two seals embodying the present invention, these being disposed in grooves 13 formed in the exterior of the shaft. In this form of the invention, each seal is made up of four rings, each of which is preferably split as shown in Figure 2. The outer rings 14 and 15 are disposed adjacent the radial walls 16 and 17 of the grooves 13, and one of the outer faces 18 or 19 of the rings 14 and 15 bears and seals against one of these radial surfaces or shoulders, depending upon the direction of the pressure along the shaft. The rings are dimensioned so as to engage the inner surface of the housing only lightly if at all, so that the relative rotation may take place between the rings and both the shaft and the housing.

To prevent fluid from passing along the housing outside of the rings 14 and 15, the inner rings 20 and 21 are provided. These rings may be composed of a resilient material such as steel and are formed to spring outwardly into sealing engagement with the inner surface of the housing 11. Two rings are preferably employed so that the gaps 22 and 23 thereof may be staggered to prevent leakage therethrough. In operation, fluid pressure, for example in the direction of the arrow in Figure 3, will cause the assembly of rings to move in the direction of the pressure until the outer face 18 of the ring 14 engages the radial surface 16 of the groove 13. In this position the ring 14 is sealed against the shaft by the engagement of the radial faces 16 and 18, the ring 20 is sealed against the ring 14, and the rings 20 and 21 are sealed against the inner surface of the housing. Thus the clearance space is effectively blocked against the passage of fluid. The seal is effective in either direction for if pressure were applied in the opposite direction, the face 19 of the ring 15 would seal against the surface 17, the ring 21 would seal against the ring 15 and the rings 20 and 21 would seal against the housing as before.

It is to be noted that in operation the rings 20 and 21 do not rotate with respect to the housing but remain fixed except for such small sliding movements as may be necessary to take up the clearances between the groove and rings. Thus the friction characteristics of the housing and rings 20 and 21 need not be considered, and the rings can be made of steel or other material having the desired resilience and strength to enable them properly to engage the housing. This makes possible the use of rings, such as those shown in the drawing, which are of such thinness that they can be snapped into the grooves without distorting them sufficiently to give them a permanent set. Similarly the rings 14 and 15 can be of material selected primarily for its friction characteristics as these rings merely float between the shaft and housing and are subjected mainly to compressive forces. Thus these rings may also be thin, and are preferably made of bronze or similar material and, if desired, may be silver plated to prevent scuffing during the initial running-in period.

While four rings have been shown in Figure 1 of the drawing, it will be evident that it is not necessary to employ that number of rings. In Figure 4, for example, I have shown seals modified in the number of rings employed and also in that, rather than forming the grooves directly in the shaft, the shaft 10a is provided with grooves by mounting thereon a grooved collar 25 having grooves 26 therein. Here the seal is intended to seal against pressure in one direction only and comprises two steel rings 28 and 29 bearing against the inner surface of the housing 11a and a single bronze ring 30 floating between the housing and the collar and engaging the radial surface 31 of the groove. Inasmuch as only one bronze ring is employed in the seal of Figure 4, it will only resist pressure in one direction. The seal could further be simplified by employing only one steel ring, but such a seal would not be quite as efficient for there might be slight leakage in the joint of the split ring. Obviously this type of seal can be positioned in a groove formed directly in the shaft as shown in Figure 1, or a seal such as shown in Figure 1 can be utilized with a collar such as illustrated in Figure 4.

The seals shown in Figures 1 and 4 are highly effective so long as there is a definite pressure of fluid acting on the seals to take up the clearance between the rings and the groove. However, in installations where the apparatus may be subjected to only a very slight fluid pressure when it is not in operation, it is possible for small quantities of fluid to seep or ooze through such a seal, for the pressure might not be great enough to effect sealing engagement between the floating ring and the side wall of the groove. In such installations, I preferably employ a seal of the type shown in Figures 5, 6 and 7. This seal is illustrated as being mounted in a groove 35 formed in a collar 36 carried by the shaft 10b which passes through an opening in the housing 11b. The sealing members are similar in all essential respects to the sealing rings described with reference to Figure 1 and comprise outer rings 37 and 38 made of bronze, for example, and floating between the housing and the shaft, and inner rings 39 and 40 resiliently engaging the inner surface of the housing. In this form, however, a resilient member 41 is positioned between the rings 39 and 40 tending to urge them apart and thus maintaining a sealing engagement between the rings 39 and 37, between the rings 40 and 38, and between the rings 37 and 38 and the radial faces 42 and 43, respectively, of the grooves 35, at all times, regardless of the presence or absence of fluid pressure on the seals.

While the resilient member may be of any suitable construction, I preferably employ a member which will give uniform pressure at all points of its circumference, such a member being described in detail in the prior patent of Dean M. Solenberger, No. 1,574,634, issued on February 23, 1926, and as shown in Figure 7, comprising a ring transversely split as at 44 and provided with circumferentially extending grooves as at 45 and 46. This provides a resilient structure which acts substantially uniformly at all points in axial directions, and which is also very compact. Ordinarily, resilient rings of this type are composed of cast iron, but other suitable materials may be employed if desired.

In the drawing I have shown two seals in series on the shafts. Obviously only a single seal may be necessary in many installations, and for some purposes it may be desirable to employ more than two seals. The number of seals to be used depends upon the nature of the service and the amount of leakage permissible. In general, it may be stated that the seals are effective substantially to prevent leakage between the shafts and the housings through which they extend and by selecting the proper type and number of seals, almost any specification for maximum allowable leakage can be met.

It will be noted that the rings making up the seals are preferably thin axially as compared to their width in radial directions. Rings of this sort are advantageous because they can be easily and economically manufactured and because they are compact and light in weight. While the dimensions of the rings will vary in different installations, as an example of a typical installation, rings having an axial thickness of 0.030" and a radial width of 0.105" have been used successfully to seal a shaft having a diameter of 2.70", passing through an opening 2.75" in diameter. The compactness and lightness of the rings are highly advantageous particularly in installations intended for aircraft. Further the thin rings can be snapped into place in the grooves without permanent distortion and the inner rings will conform properly to the housing so as to substantially prevent leakage. The use of thin rings is made possible by the design of my seal wherein the outer rings are subjected principally to forces in compression so that they need not have any great modulus of elasticity, whereas the inner rings, which are expanded against the housing do not rotate with respect to the housing so that the frictional characteristics of the material need not be considered, and the housing is not subjected to wear. Thus the inner rings can be made of steel having a high modulus of elasticity to enable the rings to engage the interior surfaces of the housing with sufficient force to make effective seal and to prevent the rings from rotating with respect to the housing even though the rings are quite thin and light.

Inasmuch as the fluid pressure along the shaft acts to produce the sealing engagement particularly in the modifications shown in Figures 1 and 4 of the drawing, it is not necessary to form the groove to very exact dimensions for a slight clearance as shown, for example at 24 in Figure 3, does not impair the efficiency of the seal. Similarly the tolerances in the type shown in Figure 5 need not be close for the resilient center ring 41 will take up the clearance, insuring a seal under all conditions. Seals made according to the present invention withstand radial vibration of the shafts effectively for the outer rings can float between the radial surfaces which they engage and the inner rings. The seals also effectively withstand lengthwise or axial vibration of the shaft and have a vibration dampening or shock absorbing effect because of the presence of a number of radial oil films between the several rings and annular surfaces. These oil films act to cushion the vibrations with the result that such vibrations do not damage the seals or reduce their efficiency. For these reasons and also for the reason that the speed of rotation of the outer rings may be about half of the rotational speed of the shaft, and because the outer rings can be selected for their frictional characteristics, seals made according to my invention are durable and maintain their efficiency throughout long periods of service.

In the drawing I have illustrated the seal as being positioned in grooves formed in the exterior surfaces of shafts. Those skilled in the art will appreciate that the seals will operate effectively with the grooves provided in the housing rather than on the shaft. In this case the inner rings, instead of expanding into frictional engagement with the housing contract to grip the shaft while the outer rings, instead of making sealing engagement with the annular shoulders or surfaces on the shaft make sealing engagement with annular surfaces or shoulders on the housing. Various other changes and modifications can be made in my invention without departing from the spirit or scope thereof and accordingly it is to be understood that my patent is not limited to the preferred forms of my invention described in the foregoing specification or in any manner other than by the appended claims when given the range of equivalents to which my patent may be entitled.

I claim:

1. A seal for preventing leakage of fluid between a rotating shaft and a housing having an opening through which the shaft extends, the shaft being provided with an annular shoulder, said seal comprising a split ring surrounding said shaft and disposed adjacent said annular shoulder and dimensioned so that its peripheral surfaces are out of substantial frictional engagement with said housing and said shaft whereby said ring is readily rotatable with respect to both said housing and said shaft, one lateral face of said ring sealing against said shoulder, and another split ring dimensioned so that its outer periphery is in sealing engagement with said housing and being substantially non-rotatable with respect thereto and slideable with respect thereto under the influence of fluid pressure, and having a lateral face in sealing engagement with the other lateral face of the first ring.

2. A seal for preventing leakage of fluid between a rotating shaft and a housing having an opening through which the shaft extends, the shaft having a groove providing an annular shoulder, said seal comprising a thin split bronze ring disposed within said groove adjacent said annular shoulder and dimensioned so that its peripheral surfaces are out of substantial frictional engagement with said housing and said shaft whereby said ring is readily rotatable with respect to both said housing and said shaft, one lateral face of said ring sealing against said shoulder, and a pair of thin split steel rings disposed in said groove and dimensioned so that their outer peripheries are in sealing engagement with said housing, said steel rings being substantially nonrotatable with respect to said housing and slideable with respect thereto under the influence of fluid pressure, one of said steel rings having a lateral face in sealing engagement with the other lateral face of said bronze ring.

3. A seal for preventing leakage of fluid between a rotating shaft and a housing having an opening through which the shaft extends, said shaft having a groove providing a pair of opposed annular shoulders, said seal comprising a pair of thin split outer rings disposed in said groove and being dimensioned so as to have their peripheral surfaces out of substantial frictional engagement with said housing and said shaft whereby said rings are readily rotatable with respect to both said housing and said shaft, the outer lateral faces of said rings being adapted to seal against said shoulders, and a pair of thin split inner rings disposed between said outer rings, said inner rings being dimensioned to have sealing engagement with said housing and being substantially non-rotatable with respect thereto and slideable with respect thereto under the influence of fluid pressure, and having lateral faces adapted to make sealing engagement with the inner lateral faces of said outer rings.

4. A seal for preventing leakage of fluid between a rotating shaft and a housing having an opening through which the shaft extends, one of said members being provided with an annular shoulder, said seal comprising a thin split metallic ring composed of a metal having good friction characteristics with respect to the material of the shoulder disposed adjacent said shoulder, said ring being dimensioned so as to have its peripheral surfaces out of substantial frictional engagement with said housing and said shaft whereby said ring is readily rotatable with respect to both said housing and said shaft, one lateral face of said ring sealing against said shoulder, and another thin split metallic ring disposed adjacent said first ring on the side thereof away from said shoulder, said other ring having a peripheral surface in sealing engagement with the other of said members and a lateral surface in sealing engagement with the other lateral face of the first ring, and said other ring being composed of a metal having a sufficiently high modulus of elasticity to enable it to engage said other member with sufficient force to make an effective seal and to substantially prevent the ring from rotating with respect thereto.

5. A seal for preventing leakage of fluid between a rotating shaft and a housing having an opening through which the shaft extends, the shaft having a groove providing an annular shoulder, said seal comprising a split ring disposed in said groove adjacent said annular shoulder and dimensioned so that its peripheral surfaces are out of substantial frictional engagement with said housing and said shaft whereby said ring is readily rotatable with respect to both said housing and said shaft, one lateral face of said ring sealing against said shoulder, a split radially resilient ring disposed in said groove and dimensioned to have sealing engagement with said housing and being slideable and substantially non-rotatable with respect thereto and having a lateral face in sealing engagement with the other lateral face of the first ring, and an axially resilient ring disposed in said groove for urging said radially resilient ring into sealing engagement with said first ring and said first ring into sealing engagement with said shoulder.

RALPH C. THOMPSON.